United States Patent [19]

McFadden et al.

[11] Patent Number: 4,670,512
[45] Date of Patent: Jun. 2, 1987

[54] ACRYLIC COATING COMPOSITIONS AND METHOD THEREFOR

[75] Inventors: Russell T. McFadden, Freeport; David A. Grilli, Lake Jackson; William R. Hunt, Angleton, all of Tex.

[73] Assignee: The Dow Chemical Company, Midland, Mich.

[21] Appl. No.: 839,850

[22] Filed: Mar. 14, 1986

[51] Int. Cl.⁴ ............................................. C08F 20/26
[52] U.S. Cl. ................................. 525/223; 525/221; 526/318.42; 526/320
[58] Field of Search ..................... 526/318.41, 318.42, 526/320; 525/223, 221

[56] References Cited

U.S. PATENT DOCUMENTS 3,594,410 7/1971 Cohen .................................. 526/320
4,429,097 1/1984 Chang et al. .................. 526/318.41

Primary Examiner—Paul R. Michl
Attorney, Agent, or Firm—A. Cooper Ancona

[57] ABSTRACT

High solids containing thermoset resins are made by admixing the adduct of an alkylene oxide and a hydroxyalkyl (meth)acrylate with one or more polymerizable vinyl monomers. A more preferred method is to blend a co-reactive flexibilizing homopolymer or copolymer of the adduct with a rigid vinyl polymer or copolymer to form a thermosettable mixture of polymers. The adduct or polymer-containing adduct is present in amount of from about 5 to about 95% by weight of the monomer or polymer mixture.

16 Claims, No Drawings

ACRYLIC COATING COMPOSITIONS AND METHOD THEREFOR

BACKGROUND OF THE INVENTION

Thermoset acrylic resins are widely used in producing ing coatings which have good flexibility and impact resistance. High solids coatings are of particular value to the automotive industry. Requirements for such coatings include toughness, flexibility, hardness and impact resistance.

Additionally, as environmental pollution standards controlling emissions of volatile organic compounds (VOC) have become increasingly more stringent over the past several years, coating producers have moved into the area of high solids thermoset coatings to attempt to meet such requirements. The limitation to higher solids in many cases is the spray viscosity which is the maximum viscosity the equipment utilized can tolerate. Thus, the need for even higher solids without viscosity increase is a very immediate and essential need of the industry. Further, with the advent and increasing use of plastic parts, more flexible coatings need to be designed without sacrificing the desired properties. Also, foreign competition in the automotive industry in particular has forced the U.S. industry to offer 5 and 10 year guarantees on automotive coatings. This has made industry require tougher coatings. In addition better chip resistant coatings, which require more flexible type resins, are needed.

The present invention is a method for improving flexibility and impact resistance of acrylic thermoset coatings and at the same time increasing solid levels that can be incorporated into a formulation at a specified reduced spray viscosity by adding a "co-reactive" monomer to a polymerization mix or, alternatively, by blending a "co-reactive" flexible polymer additive with a known rigid polymer to make a thermoset resin. The latter method of blending a "co-reactive" polymer is preferred because it provides a versatile and economic means of preparing acrylic thermoset coatings with varying degrees of toughness, flexibility, solid levels, hardness, and crosslink density to meet a wide variety of specific needs without redesigning a copolymer type resin for each need.

Compositions of the present invention are provided by reacting an alkylene oxide-hydroxyalkyl (meth)acrylate adduct, wherein the alkylene and hydroxyalkyl groups may each contain 2-8 carbon atoms, together with other polymerizable monomers. The adducts are made in the manner described in U.S. Pat. Nos. 3,312,654 and 4,126,527. The former '654 patent employs these adducts by reacting them with other polymerizable monomers, e.g. styrene or acrylonitrile; while the latter '527 patent employs such adducts to form polyacrylates by reaction with polyisocyanates or polycarboxylic acid polyanhydrides to provide plurality of ethylenically unsaturated acrylic acid ester groups which are used in radiation curable coating compositions.

Another patent, U.S. Pat. No. 3,773,710, teaches the use of physical blends of hard acrylic polymers with soft acrylic polymers. The former have a glass transition temperature $> -20°$ C., while the latter have one $> -20°$ C. Blends in which the glass transition temperatures of the hard and soft components differ by at least 30° C. are said to give a good flexible, durable coating when mixed with a heat reactive condensate, e.g. a methylated melamine formaldehyde resin, to form a thermoset coating. The soft polymer which is added to the hard polymer in an amount within the range of 5-40% by weight is a copolymer of an alkyl (meth)acrylate with a hydroxyalkyl (meth)acrylate wherein the hydroxyalkyl ester amounts to 5-20% of the copolymer. The hard polymer may also contain 5-20% of hydroxyalkyl ester, the remainder being alkyl (meth)acrylates or styrene and mixtures thereof.

SUMMARY OF THE INVENTION

High solids thermoset resins having high gloss, moisture resistance and good adhesion as well as toughness, flexibility and hardness have been made by admixing (1) about 5-95% by weight of an alkylene oxide adduct of a hydroxyalkyl (meth)acrylate wherein the average number ($\bar{n}$) of alkylene oxide units is 1 to 15 with (2) about 95-5% by weight of a mixture of styrene, a hydroxyalkyl (meth)acrylate and an alkyl (meth)acrylate, wherein the alkylene oxide, the hydroxyalkyl and alkyl groups of the (meth)acrylate esters have 2-8 carbon atoms. The monomer mixture is then polymerized to form a thermosettable resin.

In an alternate and more versatile method the alkylene oxide adduct of the hydroxyalkyl (meth)acrylate is homopolymerized or copolymerized to form a highly co-reactive flexibilizing homopolymer or copolymer which is blended with a co-reactive rigid homopolymer or copolymer, formed by polymerizing, for example, one or more of styrene, hydroxyalkyl (meth)acrylates and alkyl (meth)acrylates, vinyl chloride and the like monomers known to the art, to form a mixture of polymers which is thermosettable.

As copolymers equivalent to the hompolymer of the adduct one can employ copolymers of numerous vinyl monomers with the hydroxyalkyl meth(acrylate)-alkylene oxide adduct wherein the adduct is present in any amounts from at least about 25% and higher of the copolymer. Thus, for example, the adduct can be copolymerized with alkyl (meth)acrylates, hydroxyalkyl (meth)acrylates, styrene, vinyl chloride, vinylidene chloride, acrylic acid, methacrylic acid and the like.

DETAILED DESCRIPTION OF THE INVENTION

The compositions of the present invention can be made by one of two methods. Both employ known monomers, in particular, the adduct previously mentioned. The adduct can be added to other vinyl monomers and copolymerized to form the desired thermosettable resins useful in coating compositions. Alternatively, the adduct is homopolymerized or copolymerized and the resulting co-reactive flexible homopolymers or copolymers are blended with a co-reactive rigid resin, a copolymerized vinyl monomer mixture of $\overline{M}w = <20,000$, to form a blend of the highly co-reactive flexibilizing adduct homopolymer or adduct containing copolymer and resins of copolymerized vinyl monomers. This thermosettable polymer mixture has substantially the same properties for coating compositions as the above copolymer prepared from the mixture of vinyl monomers and adduct.

The co-reactive flexibilizing polymer is further defined in that it has a high percentage of hydroxyl groups, the homopolymer having one hydroxyl per repeating unit. In order to have the flexibilizing property the copolymer must have at a minimum about an average of one hydroxyl group for each four repeating units.

The adduct is made by reacting an excess of an alkylene oxide, e.g. propylene oxide, with one mole of a hydroxyalkyl (meth)acrylate, e.g. β-hydroxyethyl acrylate, in the presence of a Lewis acid catalyst, e.g. boron trifluoride. The resulting polyether adduct is a mixture of adducts in which the average number (n) of alkylene oxide units is 1 to 15. Detailed description of this reaction is given in the art previously cited and in an example of this application.

The vinyl monomer mixture to which the adduct may be added includes styrene, vinyl toluene, vinylidene chloride, α-methyl styrene, vinyl naphthalene, vinyl ethers, e.g. methyl and ethyl vinyl ether; alkyl (meth)acrylates in which the alkyl group contains from 1 to 8 carbon atoms, e.g. methyl (meth)acrylate, n-butyl (meth)acrylate, ethyl (meth)acrylate, 2-ethylhexyl (meth)acrylate, isobutyl (meth)acrylate, n-propyl (meth)acrylate; hydroxyalkyl (meth)acrylates in which the hydroxyalkyl group contains from 2 to 8 carbon atoms, e.g. 2-hydroxyethyl (meth)acrylate, 2-hydroxy-n-propyl (meth)acrylate, 1-methyl-2-hydroxyethyl (meth)acrylate, 2-ethyl-2-hydroxyethyl (meth)acrylate and 1-ethyl-2-hydroxyethyl (meth)acrylate.

Other vinyl monomers which can be added include glycidyl methacrylate, acrylonitrile, acrylic acid, methacrylic acid, 3-acryloxypropanoic acid, adducts formed by reacting hydroxyalkyl (meth)acrylates with lactones, and methyl acrylamidoglycolate methyl ether (MAGME*).
*Tradename of American Cyanamide Company An alternative, preferred and more versatile method is to copolymerize at least about 25% of the adduct with one or more vinyl monomers, in order to obtain about 5% by weight OH in the copolymer, e.g. alkyl (meth)acrylates, hydroxyalkyl (meth)acrylates, styrene, vinyl toluene, acrylic or methacrylic acids or any of the above mentioned monomers employed to make the previously defined co-reactive flexibilizing thermosettable resins. Of course, a hompolymer of the above adduct can be employed. Either the homopolymer or copolymer containing the adduct can be blended in various amounts of from about 5% to 95% by weight of the total of flexibilizing and rigid resins to form the thermosettable composition.

The following representative examples describe the two methods of producing the thermosettable resins of this invention and the results attained thereby.

EXAMPLE A

Preparation of the Adduct

Into a clean, dry two-liter spherical PYREX vessel fitted for temperature control at 20°–25° C., stirring, continuous metered liquid reactant addition, and venting through a condenser, was charged 400 g of 2-hydroxyethyl acrylate (HEA), and from a feed reservoir was charged 600 g (720 ml) of propylene oxide (PO). Stirring of the HEA was begun and 0.84 ml of boron trifluoride ethyl ether complex was added. Following this the addition of propylene oxide to the reactor was begun at a uniform rate so as to be completed in six hours. The reaction vessel was partially immersed in ice water throughout the reaction so as to maintain the temperature of the reacting mass at 20°–25° C.

When 360 ml of the propylene oxide had been added, an additional 0.42 ml of boron trifluoride ethyl ether complex was added to the reacting mass and the same when the propylene oxide feed was completed. The mixture, a clear colorless liquid, was stirred for three additional hours at 20°–25° C. to complete the reaction, then 90 gms of 80–200 mesh absorbent alumina was added and this mixture was stirred at 20°–25° C. for two hours to reduce the boron trifluoride content of the product.

The mixture of product and alumina was then filtered through one-quarter inch of diatomaceous earth, yielding a clear colorless oil as a filtrate. This was vacuum stripped for one hour with a slow air purge, at 45°–55° C. and 5 mm pressure, to remove traces of water, propylene oxide, and other light impurities. The stripped product was stabilized against polymerization by the addition of 250 ppm p-methoxyphenol and bottled.

Gas chromatographic analysis showed the product to be a mixture of 2-hydroxyethyl acrylate and HEA-(PO)n, with the adducts containing two and three moles of PO being the most abundant. Other adducts ranging from molar ratios of one to five were also present.

EXAMPLE B (1) Preparation of a Co-reactive Flexibilizing Homopolymer of the Adduct To a 5-liter, 5-neck flask fitted with a stirrer, thermometer, and condenser was charged 786 g of AROMATIC-100* solvent. After heating to 145° C., 2000 g (1922 ml) of HEA-(PO)n, the product of Example A, and 21.4 g of an organic peroxide catalyst (LUPERSOL 70)** were added with stirring over approximately a 5 hour period (384 ml/hr). After addition, the contents of the flask were allowed to react for 1 hour more at 145° C. The highly co-reactive flexibilizing resin was then cooled and transferred to a sample container.
*Trademark of Exxon, Inc. for an aromatic solvent having a b.p range of 152°–68° C.
**Trademark of Lucidol-Pennwalt Company (2) Preparation of a Representative High Solids Acrylic Rigid Copolymer Resin To a 5-liter, 5-neck flask fitted with stirrer, thermometer, and condenser was charged 1032 g of AROMATIC-100 solvent. At reflux, a monomer mixture* was added slowly with stirring over a period of approximately 6 hours. After addition was completed, the contents of the flask were allowed to react for 1 more hour at reflux. The co-reactive rigid copolymer resin was then cooled and transferred to a sample container. Weights and percentages of monomers in the mixtures polymerized, omitting the weight of catalyst are given in Table I.

EXAMPLE 1

Preparation of Thermosettable Adduct-Containing Acrylic Copolymers of the Invention Using the same apparatus described in Example B(1) above, 397 g of AROMATIC-100 solvent was charged to the flask. At reflux, the monomer mixture* and catalyst (LUPERSOL 70) was added with stirring over approximately a 5 hour period. After addition, the contents of the flask were allowed to react for 1 hour more at a reflux. The resin was then cooled and transferred to a sample container. Three different resin compositions were prepared, containing 20, 40 and 75% by weight of the monomer adduct of Example A, indicated as (a), (b) and (c) respectively in Table I.
*The weights (g) and weight % of the monomers polymerized in Examples B(2) and 1 (a), (b) and (c) are given in Table I.

TABLE I

| Monomers* | Ex. B(2) g | Wt. % | Ex. 1(a) g | Wt. % | Ex. 1(b) g | Wt. % | Ex. 1(c) g | Wt. % |
|---|---|---|---|---|---|---|---|---|
| Styrene | 903 | 35 | 240 | 24 | 180 | 18 | 75 | 7.5 |
| n-BuAcr | 774 | 30 | 160 | 16 | 120 | 12 | 50 | 5.0 |
| n-BuMAcr | 516 | 20 | 120 | 12 | 90 | 9 | 37.5 | 3.75 |
| HEA | 387 | 15 | 280 | 28 | 210 | 21 | 87.5 | 8.75 |
| HEA—(PO)n | — | — | 200 | 20 | 400 | 40 | 750 | 75.0 |
| Catalyst | 70.5 | — | 27.3 | — | 27.3 | — | 27.0 | — |

*n-BuAcr = n-butyl acrylate
n-BuMAcr = n-butyl methacrylate
HEA = 2-hydroxyethyl acrylate
HEA—(PO)n = product of Example A (adduct)

The above resins and those of subsequent examples were characterized as follows:

(1) Brookfield Viscosity

After 24 hours of resin conditioning, a Brookfield LVT viscometer calibrated with commercial standards was used to determine viscosity.

(2) Weight Percent Solids

After 24 hours of resin conditioning, the weight percent solids were determined in triplicate by placing 0.5 g of resin in a tared aluminum weighing dish and heating it in a forced air oven at 110°±2° C. for one hour. The dish was cooled, reweighed and % solids calculated.

(3) Molecular Weight/Polydispersity

For determination of $\overline{M}w$, $\overline{M}n$ and $\overline{M}w/\overline{M}n$ (polydispersity) of the resins, GPC measurements were performed on a Waters chromatographic system (model 6000) with commercial μ-Styragel* columns and polystyrene standards using the LDC Milton Roy Software Program GPC3.
*Tradename of Waters Associates, Inc.

(4) Weight Percent Hydroxyl

The weight percent hydroxyls reported for the resins of this invention were determined theoretically.

An alternative and preferred method of preparing the thermosettable resins of the invention by blending the co-reactive flexibilizing adduct homopolymer and the copolymerized vinyl monomer mixture is shown in Example 2 following.

EXAMPLE 2

Preparation of Homopolymer-Copolymer Blends

The co-reactive flexibilizing homopolymer of Example B(1) and the rigid copolymer resin of Example B(2) were blended to make thermosettable resins containing (a) 20, (b) 40 and (c) 75 weight percent, respectively, of the homopolymer.

For a constant solids content of ~70% and $\overline{M}w$ and $\overline{M}n$ of about 5000–7500 and about 2100–2700, respectively, the copolymers (a), (b) and (c) of Example 1 containing the adduct have a much lower viscosity, making them easier to formulate and apply, than the representative high solids rigid copolymer. Note also that all of the examples of the invention, whether made by copolymerizing the adduct in a mixture of other monomers or by blending the homopolymer of the adduct with a co-reactive rigid copolymer, contain ~5% hydroxyl. This is shown in Table II.

TABLE II

| Resin of Ex. No. | Percent Solids | Brookfield Viscosity (cps) | Percent Hydroxyl (wt %) | $\overline{M}w$ | $\overline{M}n$ | $\overline{M}w/\overline{M}n$ |
|---|---|---|---|---|---|---|
| B(1) | 72.6 | 256 | 5.86 | 5910 | 2460 | 2.40 |
| B(2) | 70.0 | 8520 | 4.99 | 7504 | 2659 | 2.82 |
| 2(a) | 70.0 | — | 5.15 | — | — | — |
| 1(a) | 71.5 | 3739 | 5.28 | 7374 | 2220 | 3.32 |
| 2(b) | 71.0 | — | 5.35 | — | — | — |
| 1(b) | 71.2 | 1547 | 5.42 | 7415 | 2383 | 3.11 |
| 2(c) | 72.0 | — | 5.64 | — | — | — |
| 1(c) | 71.9 | 374 | 5.68 | 5398 | 2093 | 2.58 |

It is essential for automotive clear coats that the final thermosettable resin must contain a minimum of about 5% by weight hydroxyl. This is true whether the resin is formed by polymerizing a monomer mixture or by mixing a number of polymers or copolymers together. For other uses the hydroxyl content may be more or less than the 5%.

In the following example the resins defined in Table II were formulated with a crosslinker, a catalyst, a flow control agent and reduced with a solvent blend. Each of the formulated resins was then applied to a panel, solvent flashed (5 minutes), conditioned at room temperature for 72 hours, and baked and tested for certain properties.

EXAMPLE 3

Formulation of Resins

The acrylic resins defined in Table I were combined with RESIMINE 755* crosslinker in the following proportion: 2.33 parts of acrylic resin solids to 1 part of Resimine 755 crosslinker solids. Next, NACURE 5225**, blocked acid catalyst, was added to each of the solutions, using 0.80 wt.% active acid catalyst solids with respect to acrylic resin and crosslinker solids.
*RESIMINE 755—Hexaalkoxymelamine (1:1 methylated/butylated) crosslinking resin; tradename of Monsanto
**NACURE 5225—an alkarylsulfonic acid catalyst; tradename of King Industries.

A solvent blend was then prepared to reduce the formulations to a specified viscosity. It contained 52 wt.% xylene, 16 wt.% n-butanol, 12 wt.% butyl acetate and 20 wt.% methanol. A 25–50 g aliquot of the solvent blend was added to each formulation. The solutions were placed on a shaker for 30 minutes then allowed to deaerate by standing or by centrifuging. Viscosities of the resulting solutions were measured using a Zahn #2 cup. Additional aliquots of the solvent blend were then added to each solution until a Zahn #2 viscosity of 34.60±0.85 seconds was attained.

A flow control agent, MULTIFLOW***, was then added to each solution. A solution of the flow control agent (50% solids) was added to provide 0.16±0.01 wt.% solids with respect to total acrylic resin and crosslinker solids. The solutions were mixed well, deaerated, and the final Zahn #2 viscosities were determined.

These viscosities are shown in Table II together with wt.% solids.

***MULTIFLOW—Xylene solution of ethyl acrylate and 2-ethylhexyl acrylate copolymer; tradename of Monsanto.

TABLE III

| Formulation of Ex. No. | wt. % solids | Zahn #2 Viscosity (seconds) | Δ₁* | Formulation of Ex. No. | wt. % solids | Zahn #2 Viscosity (seconds) | Δ₂* | Δ₃* |
|---|---|---|---|---|---|---|---|---|
| B(2) | 55.8 | 34.8 | — | B(2) | 55.8 | 34.8 | — | — |
| 2(a) | 58.0 | 34.8 | +2.2 | 1(a) | 60.3 | 32.8 | +4.5 | +2.3 |
| 2(b) | 60.2 | 34.5 | +4.4 | 1(b) | 62.6 | 34.0 | +6.8 | +2.4 |
| 2(c) | 64.8 | 33.8 | +9.0 | 1(c) | 68.2 | 34.0 | +12.4 | +3.4 |
| B(1) | 68.8 | 34.9 | +13.0 | B(1) | 68.8 | 34.9 | +13.0 | — |

*Δ₁ = wt. % solids of blend - wt. % solids of control
Δ₂ = wt. % solids of copolymer - wt. % solids of control
Δ₃ = wt. % solids of copolymer - wt. % solids of blend

EXAMPLE 4

Application, Baking and Conditioning of Coatings

The substrates employed were: (1) UNI-PRIME* panels (cold rolled steel, 4"×12"×24 gauge thickness BONDERITE 40 treatment coated with ED 3150*) supplied by PPG Industries for all testing except knoop hardness. (2) Panels for knoop hardness testing were prepared on Parker Test Panels (BONDERITE 40 treatment, 4"×12"×24 gauge thickness, unpolished).

*UNI-PRIME—epoxy primed steel panel, PPG trademark
**BONDERITE 40—a cold rolled steel phosphate treated panel
***ED 3150—an epoxy coating, PPG trademark Automatic spraying was the means employed to apply the coating formulation to the substrate. An automated spray unit supplied by Spraymation, Inc., was employed. The spray pressure employed was 60 psi. The number of passes employed ranged from 4-6 depending on the wt.% solids level in the formulation being sprayed. After 50% (2-3) of the total passes were made, a 90 second flash was given. Spraying was then resumed. At the end of spraying, prior to baking, a 5 minute flash period was given.

Once the 5 minute flash was complete, the panels were placed in a horizontal position on oven racks. The panels were then baked in a hot air convection oven for 30 minutes at 250 degrees F. Over recovery time to bake temperature was less than 2.5 minutes. The panels were then cooled and allowed to condition at room temperature for a minimum of 72 hours before testing.

The following tests of the baked resin coating were conducted:

(A) MEK double rubs:

MEK double rubs were determined using a two pound ballpeen hammer covered with cheese cloth saturated in MEK. Double rubs were reported to initial film mar. If no mar was observed after 200 MEK double rubs, the result was reported as >200.

(B) Film thickness:

Film thickness was determined on a Fischerscope Multi 650/750C digital film thickness tester. The equipment was calibrated using 0.83, 1.00 and 3.00 mil standards. Twenty measurements were taken per panel over the entire area of the panel. The mean thickness was reported all of which were in the range of 2.00 mils±0.25 mils (reference ASTM-D-1400-67).

(C) Crosshatch adhesion:

Adhesion of the coating to both UNI-PRIME and cold rolled steel substrates was evaluated per ASTM-D-3359-78/-Method B-Cross-Cut-Tape Test. The results were summarized using the Classification of Adhesion Tests on page 711 of ASTM-D-3359.

(D) Specular Gloss (20°):

20° gloss was determined on a Multigloss tester supplied by Mallinckrodt per ASTM-D-523-80. A highly polished, plane black glass reflectometer standard having a 20° gloss of 89% was employed to calibrate the instrument. A minimum of five readings were taken encompassing the entire area of the panel. The mean average was reported.

(E) Knoop Hardness:

A Leco DM* 400 microhardness tester equipped with a Knoop diamond was employed for hardness testing of the coatings. Measurements were made only on the coatings applied directly over BONDERITE 40 cold rolled steel in order to obtain the true hardness of the coating and not the hardness of the system, i.e., coating+UNI-PRIME coating. Testing was accomplished employing a 25 g load in conjunction with an 18 second contact time. Results of the penetration were evaluated under 10× magnification. A minimum of five measurements were made per sample and the mean Knoop hardness was reported.

(F) Rapid Deformation (IMPACT: Forward and Reverse)

All measurements were made at room temperature using a Gardner Impact device as described in ASTM-D-2794-69, sections 3.1-3.3. The inner diameter of the female die was 29 mm and the diameter of the male indenter was 12.5 mm. All measurements were made on the coatings applied over UNI-PRIME due to poor adhesion of coatings directly over BONDERITE 40 cold rolled steel. The intrusion method was employed. Measurements were taken over the entire area of the panel and two values were reported in the form of a range, i.e., x-y, where x was the maximum value where no failure occurs and y was where 50% of the times tested failure occurred. x and y results were repeated several times to ensure accuracy/consistency of the results. The coatings were characterized using the following code, described in ASTM-D-2794, section 6, based on the forward impact data attained on testing the coatings:

less than 6 in-lbs: "brittle" coating
6-140 in-lbs: "average" coating
greater than 140 in-lbs: "flexible" coating
* Trademark of Leco Corporation (G) Gravelometer:

Gravelometer testing was done on the coatings applied over UNI-PRIME panels only. A standard gravelometer was employed. Measurements were made at room temperature using 1 pint samples of stones shot at the panel at 70 psi. The panels were then covered with wide masking tape then stripped off at a high shear rate and the exposed metal copper plated with a copper sulfate pentahydrate solution (ASTM-D-2794). The adherence of the clear coat to the tape, its disadhesion from the epoxy coating and of the epoxy to the metal (appearance of deposited copper) were evaluated relative to the control.

(H) Conical Mandrel/Flexibility-Elongation:

Only coatings applied over UNI-PRIME were evaluated in this test again due to adhesion failure when applied directly over BONDERITE 40 cold rolled steel. ASTM-D-522 was referenced for this testing except the protective paper containing talc, placed over the coating during testing, was eliminated in the process. Only 1 trial was made per panel. Percent elongation was not calculated, only relative cracking distances (cm) were reported. 10 cm implied complete failure, that is cracking completely across the panel.

(I) Relative Humidity Test:

ASTM-D-2247-68 was referenced for this test. The exposed metal parts or edges of coating were not protected with a suitable coating, but were found to be stable under the conditions of the test. The coatings over UNI-PRIME panels were examined for blushing, rusting, 20° gloss retention, blistering, and adhesion retention. The test was conducted for 96 hours at 100% relative humidity.

EXAMPLE 5

Property Evaluations of Coatings Prepared from Adduct Blends And Adduct-Containing Copolymers A typical acrylic resin may have many of the good, common physical features needed in many coating applications, e.g., high gloss, excellent adhesion and good humidity resistance, which makes it useful in a broad spectrum of applications. In many applications these parameters need not be varied. However, the degree of flexibility is very specific to each application since it will depend on the substrate employed, i.e., plastic or metal, the substrate thickness, and the end use application. The present invention is uniquely suited as a versatile and economic means of varying the flexibility of the system without significantly altering the above mentioned common, favorable physical properties. The excellent properties shown in Tables IV and V can be obtained by either the method of Example 1 or 2 shown above, the latter, i.e. blending a co-reactive flexibilizing homopolymer with a rigid copolymer resin, being preferred.

The particular advantage found for the preferred method of Example 2 is that hardness is retained to a greater degree when the co-reactive flexibilizing adduct-containing homopolymer or copolymer is employed at 5–50% by weight of the blend as compared to the same percentage of adduct employed in a mixture of monomers polymerized as in Example 1.

TABLE IV

| Formulation of Ex. No. | MEK Double Rubs | 20° Gloss | Crosshatch Adhesion* | Knoop Hardness |
|---|---|---|---|---|
| B(2) | >200 | 89.0 | 5 | 12.5 |
| 2(a) | >200 | 88.8 | 5 | 11.0 |
| 1(a) | >200 | 89.4 | 5 | 10.2 |
| 2(b) | >200 | 88.5 | 5 | 9.7 |
| 1(b) | >200 | 87.1 | 5 | 9.0 |
| 2(c) | >200 | 85.9 | 5 | 5.1 |
| 1(c) | >200 | 85.6 | 5 | 2.7 |
| B(1) | >200 | 82.5 | 5 | >1.5 |

*Adhesion was tested on UNIPRIME panels

TABLE V

| Formulation of Ex. No. | Gardner Forward Impact (in-lbs) | Gardner Reverse Impact (in-lbs) | Conical Mandrel Bend* (cm) | Description (ASTM-D-2794) |
|---|---|---|---|---|
| B(2) | 25–30 | >2.5 | 10.0 | average |
| 2(a) | 45–47.5 | >2.5 | 9.6 | average |
| 1(a) | 45–47.5 | >2.5 | 10.0 | average |
| 2(b) | 115–120 | 7.5–10 | 3.1 | average |
| 1(b) | 90–95 | 5.8 | 3.2 | average |
| 2(c) | 170–180 | 15–17.5 | 2.2 | flexible |
| 1(c) | >200 | 17.5–20 | 0.0 | flexible |
| B(1) | 190–200 | 15–17.5 | 1.7 | flexible |

*See description after Example 4 at (H) for interpretation of numbers.

The results of the gravelometer testing comparing the coatings made by formulating coatings from Examples 1 (copolymerizing) and 2 (blending) of the invention with the representative resin of Example B(2) did not show an improvement. However, when a harder resin was employed in place of the resin of Example B(2) the addition of the co-reactive flexibilizing homopolymer of the adduct [Example B(1)] to that harder resin did improve the results of the gravelometer test as compared to the harder resin itself.

EXAMPLE 6

Gloss Retention After Humidity Test

The results of the humidity test, conducted as described in test (I) above, showed that coatings prepared as in Examples 3 and 4 using the resins of Example B(1) and (2), 1(a), (b) and (c) and 2(a), (b) and (c) retained 20° gloss at 97% and above. MEK double rubs remained at >200, crosshatch adhesion was retained and there was no blushing or blistering of the coatings. Gloss retention data for the coatings tested are given below.

| Example No. | % Retention |
|---|---|
| B(2) | 99.0 |
| 2(a) | 98.2 |
| 1(a) | 97.0 |
| 2(b) | 99.7 |
| 1(b) | 102.0 |
| 2(c) | 101.0 |
| 1(c) | 102.0 |
| B(1) | 104.0 |

While the products of this invention can be made by including the monomeric adduct in a mixture of reactive vinyl monomers, which is then copolymerized, the preferred method is to blend the homopolymer of the adduct or a copolymer of it with the preformed rigid resins of copolymerized vinyl monomers. Thus one needs to make only two polymer batches, one of co-reactive flexibilizing homopolymer or copolymer and the other of rigid copolymer, and blending to get the desired properties instead of making a new copolymer each time different properties are needed. Other advantages have been previously described.

We claim:

1. A thermosettable resin composition having a low viscosity and a high solids content comprising (1) 5–95% by weight of a co-reactive flexibilizing homopolymer or copolymer of an adduct of a hydroxyalkyl (meth)acrylate and an alkylene oxide and (2) 95–5% by weight of a co-reactive rigid polymer of one or more polymerizable monomers including a hydroxyalkyl (meth)acrylate, an alkyl (meth)acrylate, vinyl aromatic compounds, vinyl ethers, vinyl and vinylidene halides and unsaturated carboxylic acids in (3) an organic solvent or solvent mixture, and wherein the adduct contains an average of 1–15 alkylene oxide units.

2. The composition of claim 1 wherein the adduct contains an average of 1–6 alkylene oxide moieties.

3. The composition of claim 2 wherein oxide moieties contain 2 to 8 carbon atoms.

4. The composition of claim 3 wherein the oxide moieties contain 2 to 4 carbon atoms.

5. The composition of claim 4 wherein the flexibilizing homopolymer is a homopolymer of an adduct of hydroxyethylacrylate and propylene oxide.

6. The composition of claim 2 wherein the flexibilizing copolymer is a copolymer of said adduct and a hydroxyalkyl (meth)acrylate, an alkyl (meth)acrylate, a vinyl aromatic compound or a mixture thereof.

7. The composition of claim 6 wherein the flexibilizing copolymer compositions contains at least 25% of said adduct.

8. A process of making a thermosettable resin composition by blending polymers which comprises blending in an organic solvent (1) a highly co-reactive flexibilizing polymer of an adduct of an alkylene oxide and a hydroxyalkyl (meth)acrylate with (2) a co-reactive rigid polymer of one or more vinyl monomers including hydroxyalkyl (meth)acrylates, alkyl (meth)acrylates, vinyl aromatic compounds, vinyl ethers, vinyl and vinylidene halides and unsaturated carboxylic acids, and wherein the adduct contains an average of 1–15 alkylene oxide units, thereby obtaining a high solids, low viscosity resin solution.

9. The process of claim 8 wherein the flexibilizing polymer is an alkylene oxide adduct of a hydroxyalkyl (meth)acrylate wherein the hydroxyalkyl group contains 2 to 4 carbon atoms.

10. The process of claim 9 wherein the alkylene oxide contains 2–8 carbon atoms.

11. The process of claim 9 wherein the adduct contains an average of 1–6 alkylene oxide moieties.

12. The process of claim 11 wherein the alkylene oxide moieties contain 2 to 4 carbon atoms.

13. The process of claim 12 wherein the co-reactive rigid polymer is a copolymer of a hydroxyalkyl acrylate, an alkyl acrylate, an alkyl methacrylate and a vinyl aromatic compound.

14. The process of claim 13 wherein the copolymer is obtained by polymerizing hydroxyethyl acrylate, n-butyl acrylate, n-butyl methacrylate and styrene.

15. The process of claim 14 wherein the flexibilizing polymer is a homopolymer of a hydroxyethyl acrylate-propylene oxide adduct.

16. The process of claim 15 wherein the adduct contains an average of 2–8 propylene oxide units.

* * * * *